UNITED STATES PATENT OFFICE 2,152,218

COLORING RUBBER

Walter Fairbairn Smith, Blackley, Manchester, England, assignor to Imperial Chemical Industries Limited, a corporation of Great Britain No Drawing. Application March 4, 1936, Serial No. 67,175. In Great Britain March 4, 1935

8 Claims. (Cl. 18—50)

According to this invention I color rubber superficially by incorporating an arylamide, as defined below, into rubber in bulk, vulcanise if vulcanised rubber is required, and then treat with an aqueous solution of a diazotised amine so that coupling takes place.

Incorporation may be effected by milling when using rubber, or by adding to the latex when using rubber latex.

As arylamides I use those which may be used in coloring cotton by impregnating with the arylamide and coupling on the cotton with a diazotised arylamine; especially suitable are arylamides of 2:3-hydroxynaphthoic acid and acetoaceticarylamides. As arylamines I use those (including aminoazo compounds) which may be used in coupling with the arylamides on the cotton fibre.

The invention is primarily suitable for coloring rubber in the form of thin sheet or filament. The process of the invention works equally well with thick materials and can be used for these where the cost of the extra arylamide needed is no objection.

By working according to my process the rubber is colored in shades which are fast to light and which are also fast to rubbing if a washing with hot soap and water is given after dyeing. Also, deep shades can be obtained with small proportions of arylamides calculated on the weight of the rubber mix or latex.

In treating the rubber with diazotised amine, a textile material which has been impregnated with an arylamide in the usual way may be treated at the same time. In this way an article or material made up of rubber and a textile may have the rubber and the textile both colored with the same azoic coloring matter.

The following examples in which parts are by weight illustrate but do not limit the invention.

*Example 1.*—The following rubber mix was prepared in the usual manner.

| | Parts |
|---|---|
| Rubber | 100 |
| Zinc oxide | 5 |
| Lithopone | 2 |
| Blanc fixe | 50 |
| Stearic acid | 1 |
| Sulphur | 2.5 |
| Vulcafor DAU (registered trade-mark) (accelerator) | 0.5 |
| 2-hydroxynaphthalene-3-carboxylicanilide (arylamide) | 0.8 i. e. ½% of the mix |

The mix was then sheeted thinly and cured in the press for 13 minutes at 141° C.

A portion of the thin vulcanised sheet was then immersed in a warm aqueous solution of diazotised p-nitroaniline, when after a few minutes immersion the surface of the rubber becomes red. A cutting through the sheet shows that the color has penetrated slightly into the mass. With a sheet about one sixteenth of an inch in thickness a deep reddish violet shade is obtained. This shade is almost the same as that given by the same components on cotton.

The colors obtained by using other arylamides and amines in the process of this example are shown in the following table.

| Arylamide | Amine | Color |
|---|---|---|
| 2-hydroxynaphthalene-3-carboxylicanilide | 6-benzoylamino-4-methoxy-m-toluidine | Red-violet. |
| 2-hydroxynaphthalene-3-carboxylic-α-naphthylamide | 5-nitro-o-anisidine | Blue-red. |
| Do | m-Chloroaniline | Orange-red. |
| Do | p-Chloro-o-nitro-aniline | Bluish-red. |
| Bisacetoacetic-o-tolidide | m-Chloroaniline | Yellow. |
| Do | 4-chloro-o-toluidine | Reddish-yellow. |

*Example 2.*—The following rubber mix was prepared in the usual manner.

| | Parts |
|---|---|
| Crepe rubber | 100 |
| White substitute | 80 |
| Lithopone | 40 |
| Whiting | 164 |
| Paraffin wax | 4 |
| Bisacetoacetic-o-tolidide | 2.9 |

Thin sheets of this mix were vulcanised by immersing for about 10 seconds in a 5% solution of sulphur monochloride in benzene stored in a warm air cupboard for 1 hour and then "sweetened" by treating with ammonia. The sheet is immersed in a warm aqueous solution of diazotised 4-benzoyl-2:5-diethoxyaniline. After a few minutes the surface becomes yellow.

With the same arylamide, diazotised 4-amino-4'-methoxydiphenylamine gives a light brown shade.

I claim:

1. An article of cured compounded rubber comprising a water-insoluble azo dye coupling component milled throughout the body of the rubber, said coupling component being one of the group consisting of a 2:3-hydroxy-naphthoic arylamide in which aryl is of the benzene and naphthalene series and an aceto-acetic arylamide of the benzene series, and a surface layer comprising an azo dye formed by coupling said component with a diazotized arylamine, said surface layer being coextensive in thickness with the penetration of said diazotized arylamine into the rubber when the cured rubber is immersed in an aqueous solution of said amine.

2. The process for the superficial coloration of rubber which comprises milling throughout the unvulcanized rubber an insoluble azo dye coupling component of the group consisting of the 2:3-hydroxynaphthoic arylamides in which aryl is of the benzene and naphthalene series and an aceto-acetic arylamide of the benzene series, vulcanizing the rubber, and thereafter treating the rubber with an aqueous solution of a diazotized arylamine until a surface layer of the rubber is dyed.

3. Process for superficial coloration of rubber, which comprises milling the rubber with an arylamide coupling component of the type used in dyeing cotton by the "ice-color" method, vulcanizing and forming the rubber, and thereafter treating the rubber with an aqueous solution of a diazotized arylamine.

4. Process as claimed in claim 3 in which the arylamide coupling component is a 2:3-hydroxynaphthoic arylamide.

5. Process as claimed in claim 3 in which the arylamide coupling component is an acylacetic arylamide.

6. Process as claimed in claim 3 in which the arylamide coupling component is 2:3-hydroxynaphthoic anilide.

7. Process as claimed in claim 3 in which the arylamide coupling component is 2:3-hydroxynaphthoic-$\alpha$-naphthylamide.

8. Process as claimed in claim 3 in which the arylamide coupling component is bisacetoacetic tolidide.

WALTER FAIRBAIRN SMITH.